United States Patent
Kamvysselis (12)
(10) Patent No.: US 6,795,904 B1
(45) Date of Patent: Sep. 21, 2004

(54) SYSTEM AND METHOD FOR IMPROVING PERFORMANCE OF A DATA BACKUP OPERATION

(75) Inventor: Peter Kamvysselis, Boston, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 131 days.

(21) Appl. No.: 10/109,499

(22) Filed: Mar. 28, 2002

(51) Int. Cl.[7] .............................................. G06F 12/00
(52) U.S. Cl. ..................... 711/162; 711/161; 707/204; 714/6
(58) Field of Search ................. 711/161–162; 707/202–204; 714/6, 20, 54; 709/201

(56) References Cited

U.S. PATENT DOCUMENTS

| | | | | |
|---|---|---|---|---|
| 5,592,618 A | * | 1/1997 | Micka et al. ................. | 714/54 |
| 5,638,509 A | * | 6/1997 | Dunphy et al. ............... | 714/20 |
| 5,771,367 A | * | 6/1998 | Beardsley et al. .......... | 711/162 |
| 5,852,715 A | * | 12/1998 | Raz et al. .................... | 709/201 |
| 6,484,186 B1 | * | 11/2002 | Rungta ........................ | 707/203 |
| 6,611,901 B1 | * | 8/2003 | Micka et al. ............... | 711/162 |
| 6,625,704 B2 | * | 9/2003 | Winokur ..................... | 711/162 |

* cited by examiner

*Primary Examiner*—Nasser Moazzami (57) ABSTRACT

This invention is a system and method for improving performance of a backup operation of data from a data storage system to a media library. In response to a computer system request to backup a slot or track of data, a data engine in communication with the system and a data storage system selectively reads the requested data. Such data engine reads may occur concurrent to host access for I/O operations by employing a protection scheme, e.g. a protection bit. Simultaneously, different backup sessions may read the same track of data that has been read by the data engine. The data slot or track remains in cache memory of the data storage system until all protection bits are reset. A requested slot or track may be moved to a sidefile stored in the cache memory if a host requested to write to it while protection bits are still set and then sent to the Data engine for transfer to a media library.

22 Claims, 6 Drawing Sheets

SYSTEM AND METHOD FOR IMPROVING PERFORMANCE OF A DATA BACKUP OPERATION

A portion of the disclosure of this patent document contains command formats and other computer language listings, all of which are subject to copyright protection. The copyright owner, EMC Corporation, has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates generally to handling of data in a data storage environment, and more particularly to a system and method for reading a track of data to be backed up in order to improve performance of a backup operation in a data storage environment.

BACKGROUND OF THE INVENTION

As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g. disk drives. The one or more processors perform their respective operations using the storage system. To minimize the chance of data loss, the computer systems also can include a backup storage system in communication with the primary processor and the data storage system. Often the connection between the one or more processors and the backup storage system is through a network in which case the processor is sometimes referred to as a "backup client."

The backup storage system can include a backup storage device (such as tape storage or any other storage mechanism), together with a system for placing data into the storage device and recovering the data from that storage device. To perform a backup, the client copies data from the shared storage system across the network to the backup storage system. Thus, an actual data file may be communicated over the network to the backup storage device.

The shared storage system corresponds to the actual physical storage. For the client to write the backup data over the network to the backup storage system, the client first converts the backup data into file data i.e., the client retrieves the data from the physical storage system level, and converts the data into application level format (e.g. a file) through a logical volume manager level, a file system level and the application level. When the backup storage device receives the data file, the backup storage system can take the application level data file, and convert it to its appropriate file system level format for the backup storage system. The data can then be converted through the logical volume manager level and into physical storage.

It has been recognized that it is a disadvantage for data that is involved in a backup operation to be unavailable for a host application, such as a database, to perform operations such as reads or writes. There have been remedies to such a problem in the prior art, but what is needed is resolution of such a problem with minimal to no effect on the host application, or to the data storage system itself, and also while allowing multiple backup sessions of the same data (or at least copies of the data) to occur, and while providing a straight-forward and fast performing solution.

SUMMARY OF THE INVENTION

In order to solve the problems of the prior art mentioned above, the present invention is a system and method for managing data involved with a host requested backup session.

The method of this includes enabling a data engine to be responsive to a host request to backup data stored in a data storage system by selectively reading the requested data, assigning a protected status for the read data; and allowing access to the read data for one or more host backup sessions that may occur subsequent to the first backup session until the protected status is changed to an unprotected status. Further embodiments of the method include allowing access to the data for a host I/O operation until the protected, status is changed to an unprotected status.

In an alternative embodiment, the invention includes a system for carrying out embodiments of the method steps. In another alterative embodiment, the invention includes a program product for carrying out embodiments of the method steps. In still another alternative embodiment the invention includes an apparatus enabled to carry out embodiments of the method steps.

BRIEF DESCRIPTION OF THE DRAWINGS

The above and further advantages of the present invention may be better under stood by referring to the following description taken into conjunction with the accompanying drawings in which.

DETAILED DESCRIPTION OF THE PREFERRED EMBODIMENT

The method, apparatus, and system of the present invention are each intended for use with data storage systems, such as the Symmetrix Integrated Cache Disk Array system available from EMC Corporation of Hopkinton, Mass., but are not limited to such a system.

The method, system, and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission. And may be implemented such that herein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

The logic for carrying out the method is embodied as part of the system described below beginning with reference to FIG. 1. One aspect of the invention is embodied as a method that is described below with detailed specificity in reference to FIGS. 4–8.

Data Storage Environment Including Logic for Carrying Out the Preferred Method

Figure 1:
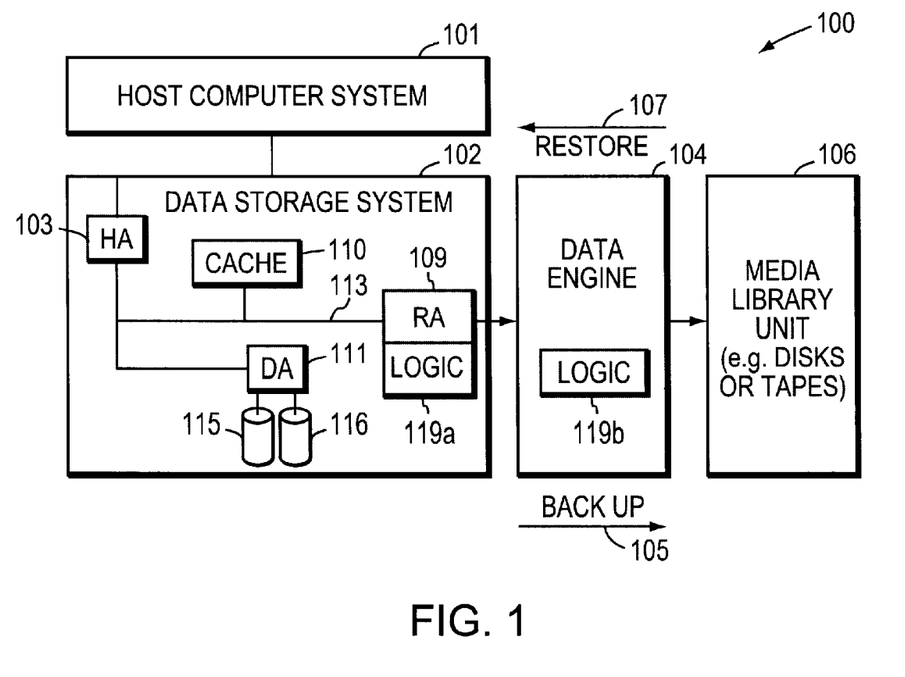
FIG. 1 is a block diagram of a data storage network including at least one host computer system, a data storage system, a data engine, and a media library and also including logic for enabling the method of the present invention.

Referring now to FIG. 1, reference is now made to a data storage network 100 in which the invention is particularly useful and includes a Data Storage System 102, host Computer System 101, Data Engine 104, and Media Library Unit 106. Such Media may include disks or tapes or other type of media including such a type not currently known, and for an efficient restore operation disks are preferred in operation of this invention.

In a preferred embodiment the data storage system is a Symmetrix Integrated Cache Disk Arrays available from EMC Corporation of Hopkinton, Mass. Such a data storage system and its implementation is fully described in U.S. Pat. No. 6,101,497 issued Aug. 8, 2000, and also in U.S. Pat. No. 5,206,939 issued Apr. 27, 1993, each of which is assigned to EMC the assignee of this invention and each of which is hereby incorporated by reference. Consequently, the following discussion makes only general references to the operation of such systems.

Generally, a Data Engine is a specialized computer for quickly moving and handling data and may include one or more data mover computers (specialized computers themselves for moving data), storage disks, communication paths, and one or more power supplies. In a preferred embodiment, the Data Engine may be an EMC Fastrax Data Engine also available from EMC Corporation of Hopkinton, Mass. Such a Data Engine is described in "Fastrax Technical Specifications" available from EMC; however the invention is not limited to such an embodiment. A Fastrax Data Engine is also described in an engineering white paper, dated Aug. 17, 2002 and available on the internet website www.emc-.com and entitled "EMC Fastrax Technology Overview."

The invention is useful in an environment wherein data is normally backed up to a media library unit 106, which may be tapes or disks. Backup normally occurs with data following in the direction shown by arrow 105, and restore in the direction of arrow 107, i.e., back to the data storage system or the host computer system.

The data storage system 119 includes a system memory or cache 110 and sets or pluralities 115 and 116 of multiple data storage devices or data stores. The system memory 110 can comprise a buffer or cache memory; the storage devices in the pluralities 115 and 116 can comprise disk storage devices, optical storage devices and the like. However, in a preferred embodiment the storage devices are disk storage devices. The sets 115 and 116 represent an array of storage devices in any of a variety of known configurations. Note that although for simplicity only storage devices 115 and 116 are shown, a plurality of even greater number would be typically employed in the preferred storage-operating environment.

A host adapter (HA) 103 provides communications between the host system 101 and the system memory 110; disk adapter (DA) 111 provides pathways between the system memory 110 and the storage device pluralities 115 and 116. More than one HA and DA may typically be employed with the preferred data storage system but in the interest of simplicity only HA 102 and DA 111 are shown. A bus 113 interconnects the system memory 110, the host adapter and the disk adapter. The cache or system memory 110 is used by various elements within the respective systems to transfer information and interact between the respective host adapters and disk adapters. The cache memory operates as a buffer in connection with storage and retrieval operations, in particular buffering data received from the host computers to be transferred to the storage devices for storage, and buffering data received from the data stores to be transferred to the host computer for processing.

Figure 2:
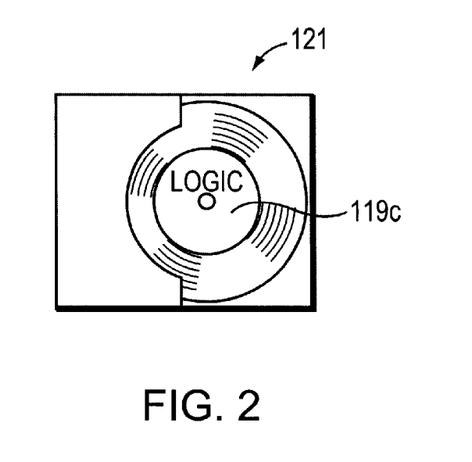
FIG. 2 is an exemplary representation of a computer-readable medium encoded with the logic of FIG. 1 for enabling the method of the present invention.

Reference is now made to FIGS. 1 and 2. Logic for carrying out the processes or method of this invention is preferably distributed among the Data Storage System and Data Engine as Logic 119a and Logic 119b, respectively. The Logic comprising Logic 119a and 199b is preferably embodied as computer software that is enabled for carrying out the method of this invention.

Using the preferred Symmetrix Integrated Cache Disk Array system available from EMC Corporation of Hopkinton, Mass. as the Data Storage System, the Logic 119a is preferably configured as microcode that communicates with the known Symmetrix API (not shown) that includes specifications for communicating therewith are available from EMC. However, as will be apparent to one skilled in the relevant computer arts in view of the flow diagrams presented with reference to FIGS. 4–9, such an implementation of the Logic 119a is not required for enabling the invention. Nevertheless in the preferred embodiment, Logic 119a is configured to operate as an inclusion of an Remote Adapter (RA), which is part of the preferred Symmetrix data storage system. The RA 109 communicates over bus 113 with DA 111 for controlling and accessing storage device pluralities 115 and 116.

In a preferred Symmetrix Data Storage System, the remote adapter or RA 109 may be typically employed for communication with remote data facilities ("RDF"), for example, connection to another storage device to maintain a mirror redundancy group, but it may also be employed as the inventor has recognized with the Data Engine 104. One form of RDF link and method of implementation is described in various publications available from EMC Corporation, including SYMMETRIX Remote Data Facility Product Manual, P/N 200-999-554, rev. B, June 1995. RDF embodiments are also described in U.S. Pat. No. 5,544,347 (Yanai), which is hereby incorporated herein by reference in its entirety. It should be appreciated, however, that the present invention is not limited to the use of RDF or to a system that employs SYMMETRIX disk arrays, and can be employed with any of numerous other types of storage systems.

Referring again to FIG. 1, Logic 119b may be stored in computer memory in the Data Engine as shown in FIG. 1 or reside elsewhere including on a computer readable medium 121 as shown in FIG. 2. The Logic may be enabled in a choice of computer program languages as will be apparent to one skilled in the art in view of the flow logic diagrams of FIGS. 4 and 9. It is preferably enabled to communicate with Logic 119a and the storage device pluralities 115 and 116 through the DA.

As shown in FIG. 2, the Logic may be included and enabled to operate from a computer-readable medium such as CD-ROM 121 encoded with Logic 119c that acts in cooperation with normal computer electronic memory as is known in the art. Logic 119c may be configured with all or at least a portion of Logic 119a and 119b for carrying out and enabling the method of FIGS. 4–9. Nevertheless, one skilled in the relevant computer-related arts will recognize that the Logic comprising 119a–b or 119c may be implemented interchangeably as hardware or software may be implemented in various fashions in accordance with the teachings presented herein.

Generally speaking, the data storage system 102 operates in response to commands from one or more computer or host systems, such as the host system 101 connected via a host adapter, such as host adapter 103. The host adapter 103 transfers commands to a command buffer that is part of system memory 110. The command buffer stores data structures and write requests that the disk adapters generate. The disk adapters, such as DA 11 respond by effecting a corresponding operation using the information in a command buffer. The selected disk adapter then initiates a data operation. Reading operations transfer data from the storage devices to the system memory 110 through a corresponding disk adapter and subsequently transfer data from the system memory 110 to the corresponding host adapt when the host system 101 initiates the data writing operation.

The host computer system 101 may be any conventional computing system, each having an operating system, such as a system available from Sun Microsystems, and running the Solaris operating system (a version of Unix), an HP system running HP-UX (a Hewlett-Packard client, running a Hewlett-Packard version of the Unix operating system) or an IBM system running the AIX operating system (an IBM version of Unix) or any other system with an associated operating system such as the Microsoft WINDOWS NT or WINDOWS 2000 operating system.

Figure 3:
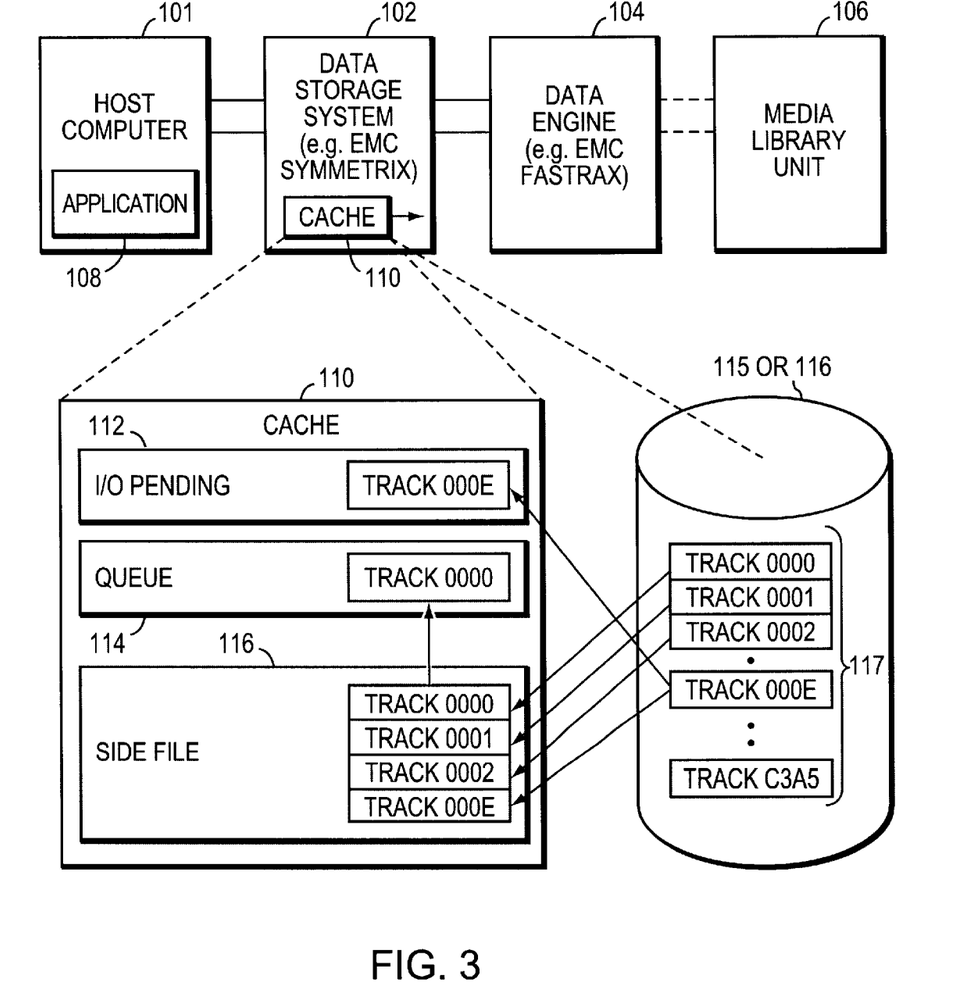
FIG. 3 is another representation of the network and systems of FIG. 1 showing queues and other data structures including a sidefile that are used with the logic of FIG. 1 for carrying out the method of this invention.

Referring to FIG. 3, an overview of the system configured for operation of the invention is schematically diagrammed. The host computer 101 may include a software application 108, e.g. a database application that has data stored on tracks collectively represented as group 117 on the plurality of storage devices 115 or 116 and for which cache 110 is in communication through bus 113 (FIG. 1). Cache 110 may store at a given instance of time representations of the tracks on the storage devices in a sidefile 116, and a queue 114 used for managing I/O requests as well as an I/O pending data structure 112. In general the sidefile and queue are also data structures for managing the I/O actions for tracks as restore operations are taking place. A consistent copy of data may be kept while applications such as application 108 continue to update the data operations for which are accounted for in the sidefile 116. Thus for a database application related tables, files and data sets may be synchronized. An intercept of I/O's pending ensures that updates are not included in the data copy being restored, but synchronization afterwards ensures that such operations are accounted for in production data.

Preferably, the system or cache memory of the data storage system includes a series of storage locations, which are organized in a series of "cache slots." The cache slots operate as the cache memory's buffer. A detailed description of slots is given in U.S. Pat. No. 5,802,557 "System and Method for Caching Information in a Digital Data storage subsystem," by Vishlitzky et al. which is assigned to the assignee of this invention and incorporated herein by reference. The storage locations are, in turn, identified by a series of addresses, with the starting address of a cache slot being identified by a base address, and any location indexed relative to the base address can obtained by reference to the base and this is known as an "extent." For simplicity, an example of such slots 117 is shown collectively containing track address information, e.g., Track 0000-Track C3A5, associated with storage device 115 or 116.

Generally, a cache index directory operates as an index for the cache slots(s) in the cache memory. Each cache index table includes identification and status information for the device such as storage device 115 or 116 associated with the cache index table. In addition, each cache index table includes a plurality of cylinder descriptors each of which is associated with one of the cylinders in the storage device that is associated with the cache index table. Each cylinder descriptor includes a plurality of track descriptors, each of which is associated with one of the tracks identified in the slots 117.

Each track descriptor, in turn, includes information for the associated track of the storage device 115 or 116, including whether a copy of the data stored on the track is stored in the cache memory 110, and, if so, the identification of the cache slot in which the data is cached. In particular, each track descriptor includes a cached flag and a cache slot pointer. The cached flag, if set, indicates that the data on the track associated with the track is cached in a cache slot, and the cache slot pointer identifies the particular cache slot in which the data is cached. In addition, each track descriptor includes a used flag which may be used to indicate whether the data, after being stored in the cache slot identified by the cache slot pointer, has been used by the host computer 101 during an I/O (e.g., read or write operation). This "host used" flag may be used to determine whether the cache slot may be re-used for another access operation.

The host adapter 103 (FIG. 1) and the device adapter 111 include a cache manager for managing access to the cache memory 110 including the cache index directory. The particular operations performed during an I/O operation will depend on a number of factors, including the access operation to be performed, whether or not the data from the particular track to be accessed is cached in the cache memory, and whether or not the data contained in a cache slot has been modified or updated by a host adapter's cache manager during a storage operation.

The cache manager of the storage adapter maintains a number of work lists that are used to control operations by the host adapter and storage adapter during an I/O operation. In particular, the cache manager has a cache slot replacement list, a pending write list and various lists which the host adapter and storage adapter use to communicate to coordinate staging and destaging operations (movement of data into cache and then from cache to disk, respectively). It will be appreciated that the various lists maintained by the cache manager may comprise any of a number of convenient forms, including queues, trees, stacks or the like, e.g. I/O or write pending and backup queues 112 and 114, respectively.

The cache slot replacement list is typically used to control re-use of cache slots during staging operations in accordance with a convenient cache-slot re-use methodology, e.g. as the well-known least recently used (LRU) algorithm in which data which has not been used for some time is destaged from cache to disk. During a staging operation, the cache manager uses the cache slot replacement list to select a cache slot into which it will load the data retrieved from a storage device. The pending write list 112 is used to identify cache slots which contain updated data, which has not been written to a storage device. In normal operation, using the preferred EMC Symmetrix Data Storage system during destaging operations, the storage adapter's cache managers will use the write pending list to identify cache slots to be written to the storage device 115 or 116.

During backup operation, data structures, namely a sidefile 116 and backup queue 114 are used for managing the I/O actions such as write for tracks as backup operations are taking place. A consistent copy of data may be kept while applications such as application 108 continue to update the data operations for which are accounted for in the sidefile 116. Thus for a database application related tables, files and data sets may be synchronized. An intercept of I/O's pending ensures that updates are not included in the data copy being restored, but synchronization afterwards ensures that such operations are accounted for in production data.

Overview of Method

Now for a better understanding of the method steps of this invention an overview is now given.

In the preferred embodiment, the Logic 119a and 119b allow the Data Engine to selectively read a track to be backed up. Protection bits are used to protect against I/O actions on the data to be backed up (e.g., an action resulting from a host write command) during the read of the data.

The Data Engine may read protected tracks essentially on demand, i.e., when requested. Concurrently, such reads may occur with host writes because of the protection scheme. Normally a scheme to optimize cache usage, e.g. as a least recently used (LRU) algorithm is employed to move data through the queue, but under operation of this invention such concurrent reads and writes may occur without requiring a LRU flush of the queue.

Advantageously, different backup sessions under control of the Data Engine can read the same track at different times. It is preferred that the slot remains in cache until all protection bits are reset. However, a slot may be moved to the sidefile if the host computer has an application that writes to the slot while it is protected. In this case, the data is sent to the Data Engine out of order.

Essentially, by employing Logic 119a and 119b, the RA of the data storage system will be able to handle Data Engine read commands and backup requests issued from the DA, also of the data storage system. Read commands will be allocated for protected slots that are still in the LRU queue while the backup requests will in turn be for sidefile slots.

The inventor has critically recognized that a typical backup operation involves many tracks of data that are never used again, and also that filling up the LRU queue with these tracks may lead to flushing the LRU cache of tracks that would soon be used again. Thus, there are inherent disadvantages in the way cache is used by prior art systems but this invention redresses such a problem by moving the slot to the top of the LRU queue when all protection bits are cleared so that slots used for backup are recycled for use again.

The overall result is that if a host write is issued for a protected track then the slot is treated with a write pending condition, but in response to a Data Engine read command there is no write pending condition assigned for the slot. The advantage of this duality is that only two LRU locks are needed in the main flow of data, i.e. for the Data Engine read command. There is no need to use a leading extents mechanism (e.g. a read-ahead from a base address of proximately located date) and no reason to perform a background copy in this situation.

Detailed Steps of Method

Figure 4:
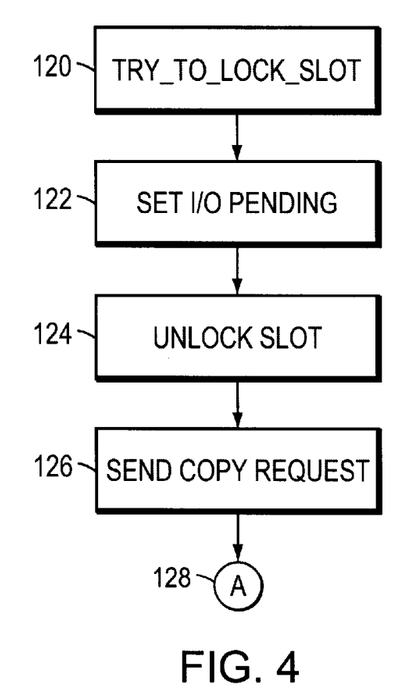
FIG. 4 is a flow logic diagram illustrating method steps of the invention carried out by the logic of this invention.

Referring now to FIG. 4, in step 120, the Logic places a protection bit on the slot for which a host I/O command, e.g. a write is issued, in the preferred embodiment, this is employed as a "try_to_lock_slot_command". An I/O pending, and in this example a write pending is thus set in step 122. The slot is then unlocked in step 124 and in step 126 a send copy request is sent to the Data Engine. Processing flows to step 128, which is a continuation stage A that connects to its identical counterpart shown in FIG. 5.

Figure 5:
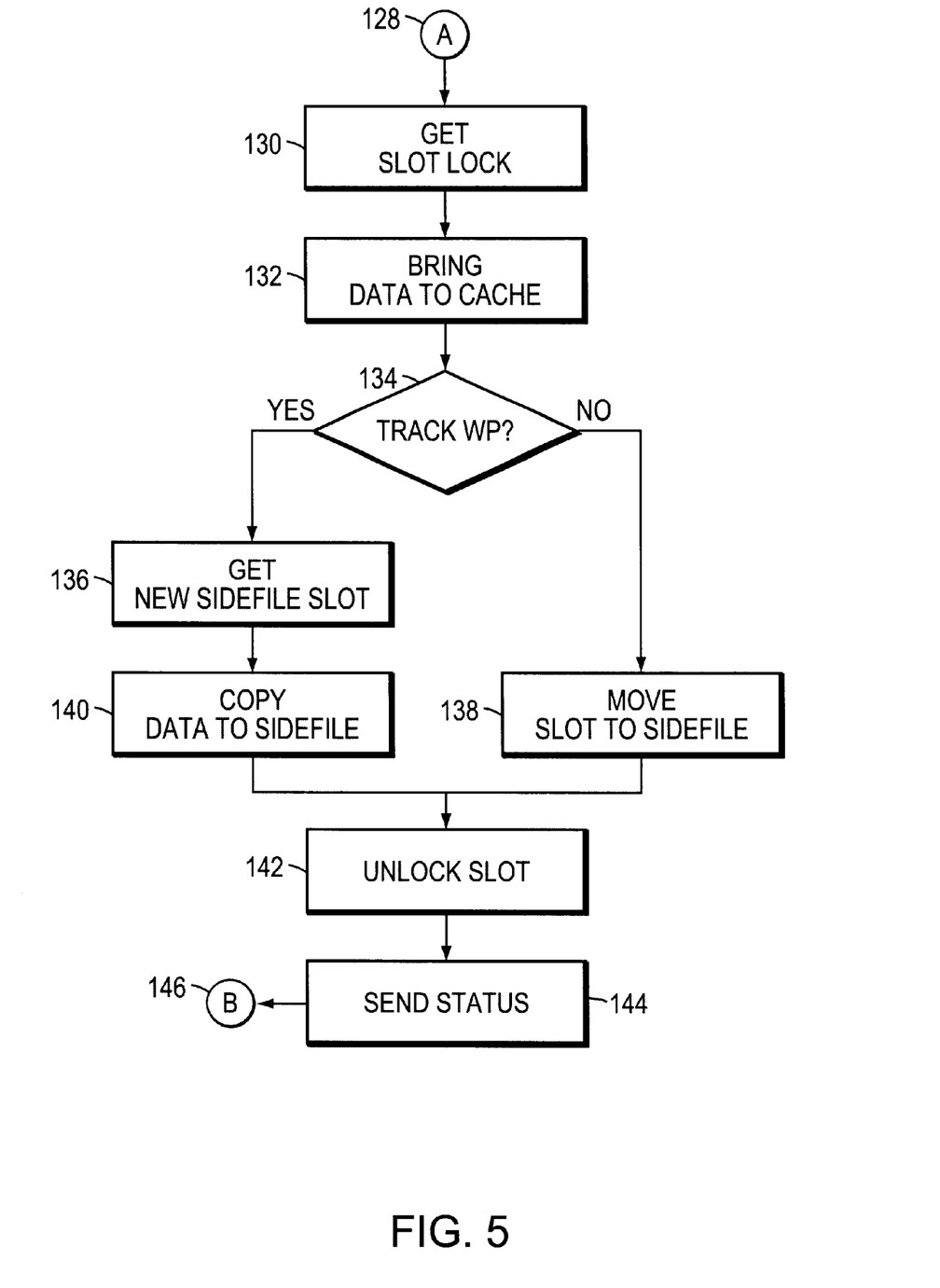
FIG. 5 is another flow logic diagram illustrating method steps of the invention carried out by the logic of this invention.

Reference is now made to FIG. 5., wherein step 128 flows into step 130. The step 130 gets the lock slot. Data is brought to cache 110 in step 132. Step 134 poses the question where the track is marked as write pending. If "Yes," then processing flows to step 136 and 140 wherein a new sidefile slot is obtained and the data is moved to the sidefile 116, respectively. If "No," then the slot itself is moved to the sidefile 116: In either case the slot is unlocked in step 142 and status of the slot is sent in step 144. Processing flows to step 146, which is a continuation stage B that connects to its identical counterpart shown in FIG. 6.

Figure 6:
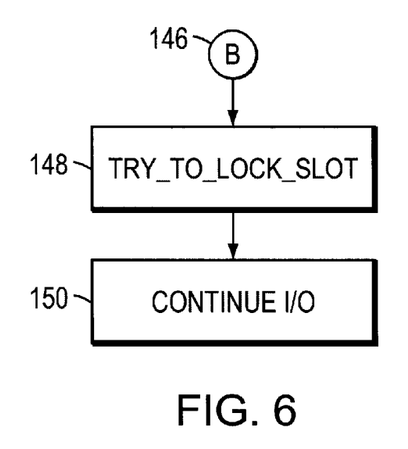
FIG. 6 is another flow logic diagram illustrating method steps of the invention carried out by the logic of this invention.

Reference is now made to FIG. 6., wherein step 146 flows into step 130. The slot is again locked (try_to_lock_slot command) instep 148 and the I/O, in this case a write, occurs in step 150.

Figure 7:
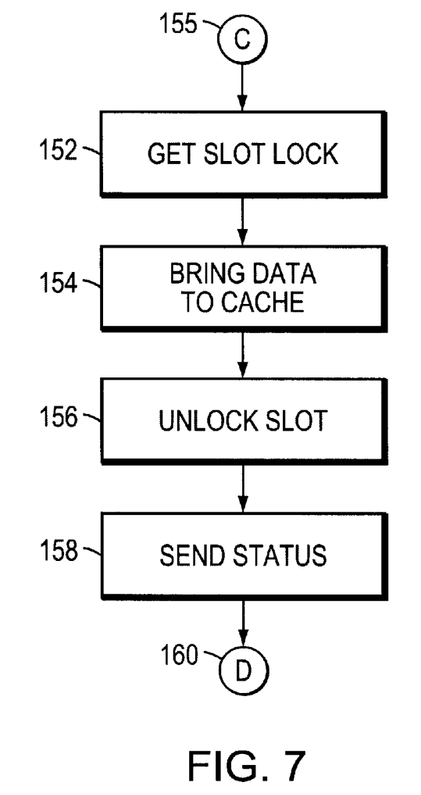
FIG. 7 is another flow logic diagram illustrating method steps of the invention carried out by the logic of this invention.

FIG. 7 shows that the slot lock is obtained in step 152. The data is brought into cache in step 154. The slot is unlocked in step 156 and the slot's status is sent in step 158. A continuation stage D being of step 160 connects to its identical counterpart shown in FIG. 8.

Figure 8:
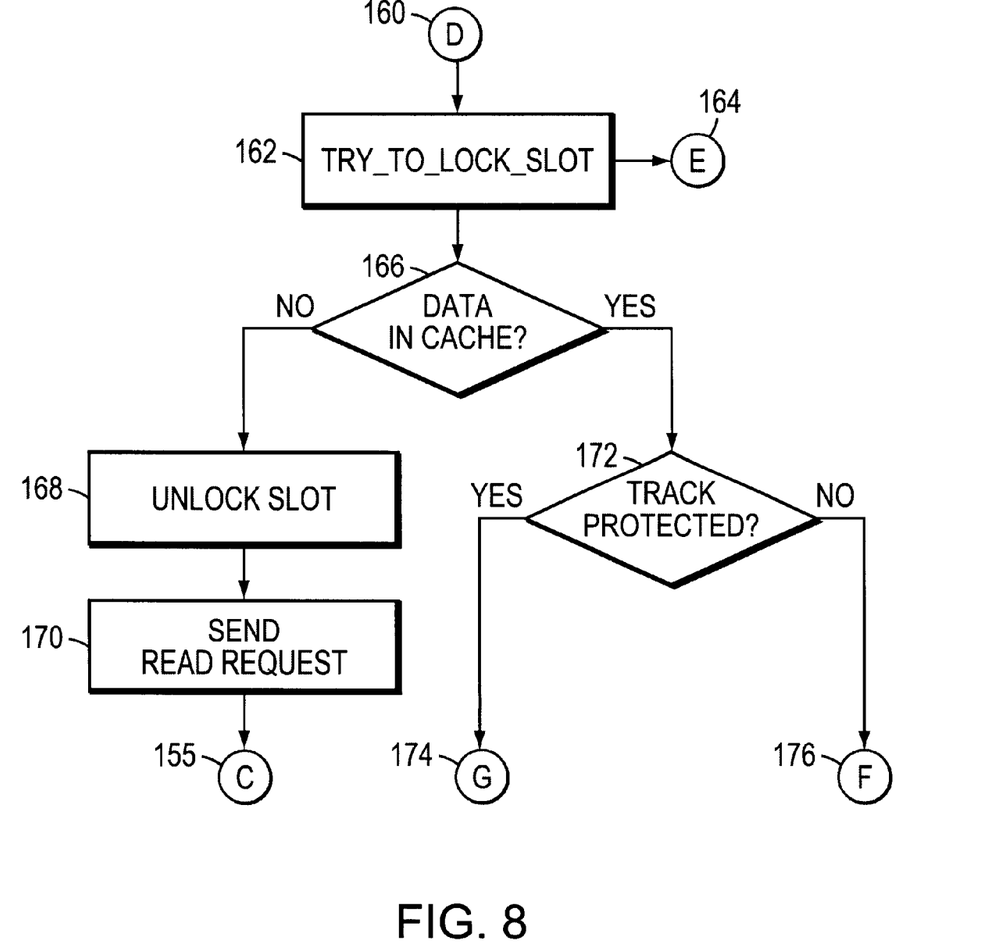
FIG. 8 is another flow logic diagram illustrating method steps of the invention carried out by the logic of this invention.

Reference is now made to FIG. 8 wherein step 160 flows into step 162, wherein in turn the slot is locked again. Step 164 is continuation stage C that connects to its identical counterpart shown in FIG. 9. Step 166 poses the question whether data requested for the I/O operation is in cache. If "No," then processing flows to step 168 and the slot is unlocked. Then a Data Engine read request is sent in step 170 and processing flows back to step 155 and then back to step 152 shown in FIG. 7. If "Yes," then it is further determined whether the track is protected in step 172. If the answer is "Yes" then processing flows to step 174 which is a continuation stage G that connects with its identical counterpart shown in FIG. 9. But if the answer is "No," then processing flows to step 176 that is a continuation stage F that connects with its identical counterpart shown in FIG. 10.

Figure 9:
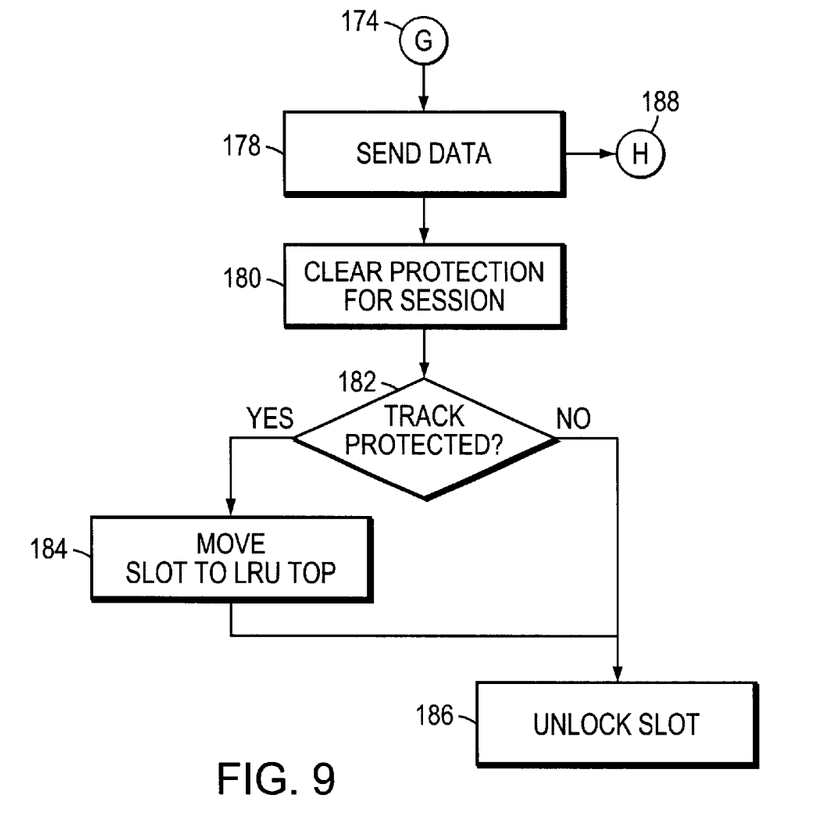
FIG. 9 is another flow logic diagram illustrating method steps of the invention carried out by the logic of this invention.

Referring to FIG. 9, step 176 flows into step 178. In step 178, the requested data is sent. Step 178 flows into either step 188 or 180 depending on circumstances. Step 188 includes a continuation stage H that flows into its identical counterpart shown in FIG. 10. In step 180, the protection bit may be cleared for the session in step 180. An inquiry step 182 determines whether the track is then protected from a host I/O operation. If not then the slot is unlocked in step 186, but if it is locked then the slot is moved to the top of the LRU queue to clear the queue of backed up tracks.

Figure 10:
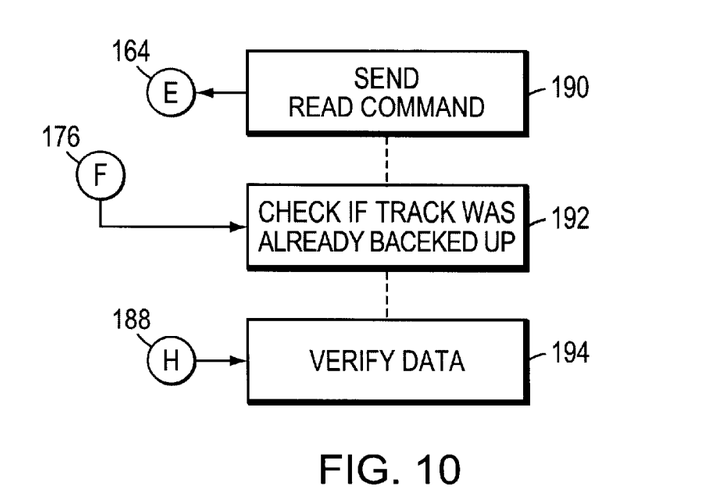
FIG. 10 is another flow logic diagram illustrating method steps of the invention carried out by the logic of this invention.

FIG. 10 includes three steps that are all reached independently in accordance with the flow of the steps described above with reference to FIGS. 8 and 9. In one case, step 164 that continues from FIG. 8 involves the sending of the read data track command to be performed by the Logic for the Data Engine. If processing has flowed intro step 176 from FIG. 8, then the Logic checks to determine if the requested track has already been backed up. Finally, if processing has flowed from step 188 in FIG. 9 then the data is verified.

A system and method has been described for managing data that may be replicated across one or more computer systems. Having described a preferred embodiment of the present invention, it may occur to skilled artisans to incorporate these concepts into other embodiments. Nevertheless, this invention should not be limited to the disclosed embodiment, but rather only by the spirit and scope of the following claims and their equivalents.

What is claimed is:

1. In a data storage environment having a data storage system with memory and at least one data storage device and wherein the data storage system is in communication with a host computer and a data engine also having memory, and wherein the data engine is in communication with a media library unit, a method for managing data that is involved in a backup operation, the method comprising the steps of:

responsive to a first backup session request from the host to backup a track of data, the data engine selectively reading the requested track of data into cache memory associated with the data engine;

assigning a protected status for the read track of data in cache memory; and allowing simultaneous access to the read track of data for one or more host backup sessions that may occur subsequent to the first backup session until the protected status is changed to an unprotected status.

2. The method of claim 1, wherein the read track of data assigned a protected status is accessible for an host I/O operation until the protected status is changed to an unprotected status.

3. The method of claim 2, wherein the host I/O operation is a write operation.

4. The method of claim 3, wherein a write pending condition is assigned to indicate the write operation for the read track of data that has a protected status.

5. The method of claim 4, wherein the read track of data is copied to a sidefile stored in memory in response to the write pending condition being assigned.

6. The method of claim 5, wherein the write operation operates on the copy of the read track of data stored in the sidefile in memory.

7. The method of claim 6, wherein the data operated on by the write operation is sent to the data engine for transfer to the media library unit.

8. In a data storage environment having a data storage system with memory and at least one data storage device and wherein the data storage system is in communication with a host computer and a data engine, and the data engine is in communication with a media library unit, a method for managing data that is involved in a backup operation, the method comprising the steps of:

responsive to a first backup session request from the host to backup a track of data, the data engine selectively reading the requested track of data into cache memory associated with the data engine;

assigning a protected status for the read track of data in cache memory; and allowing simultaneous access to the read track of data for one or more host backup sessions that may occur subsequent to the first backup session until the protected status is changed to an unprotected status.

9. The method of claim 8, wherein the host I/O operation is a write operation.

10. The method of claim 9, wherein a write pending condition is assigned to indicate the write operation for the read track of data that has a protected status.

11. The method of claim 10, wherein the read track of data is copied to a sidefile stored in memory in response to the write pending condition being assigned.

12. The method of claim 11, wherein the write operation operates on the copy of the read track of data stored in the sidefile in memory.

13. The method of claim 12, wherein the data operated on by the write operation is sent to the data engine for transfer to the media library unit.

14. A computer system comprising:

a data storage system including memory and at least one storage device;

a host computer system in communication with the data storage system;

a data engine having memory in communication with the data storage system;

a media library in communication with the data engine; and computer-executable logic in communication with the data storage system and the data engine that enables the method steps of:

responsive to a first backup session request from the host to backup a track of data, the data engine selectively reading the requested track of data into cache memory associated with the data engine;

assigning a protected status for the read track of data in cache memory; and allowing simultaneous access to the read track of data for one or more host backup sessions that may occur subsequent to the first backup session until the protected status is changed to an unprotected status.

15. The system of claim 14, wherein the read track of data assigned a protected status is accessible for an host I/O operation until the protected status is changed to an unprotected status.

16. The system of claim 14, wherein the host I/O operation is a write operation.

17. The system of claim 16, wherein a write pending condition is assigned to indicate the write operation for the read track of data that has a protected status.

18. The system of claim 17, wherein the read track of data is copied to a sidefile stored in memory in response to the write pending condition being assigned.

19. The system of claim 18, wherein the write operation operates on the copy of the read track of data stored in the sidefile in memory.

20. The system of claim 19, wherein the data operated on by the write operation is sent to the data engine for transfer to the media library unit.

21. A program product for use with a data storage system having memory and at least one storage device and which is in communication with a computer system, a data engine, and a media library unit, the program product being for carrying out a restore operation and being comprised of:

computer-executable logic configured for causing the following computer-executed steps to occur:

responsive to a first backup session request from the host to backup a track of data, the data engine selectively reading the requested track of data into cache memory associated with the data engine;

assigning a protected status for the read track of data in cache memory; and allowing simultaneous access to the read track of data for one or more host backup sessions that may occur subsequent to the first backup session until the protected status is changed to an unprotected status.

22. An apparatus for managing data involved in a backup operation, the apparatus comprising:

a data storage system with memory and at least one data storage device;

a host computer in communication with the data storage system;

a data engine also having memory and being in communication with the data storage system;

a media library unit in communication with the data engine and wherein the apparatus includes:

means responsive to a first backup session request from the host to backup a track of data, the data engine selectively reading the requested track of data into cache memory associated with the data engine;

means for assigning a protected status for the read track of data in cache memory; and means for allowing simultaneous access to the read track of data for one or more host backup sessions that may occur subsequent to the first backup session until the protected status is changed to an unprotected status.

* * * * *

UNITED STATES PATENT AND TRADEMARK OFFICE
CERTIFICATE OF CORRECTION

PATENT NO. : 6,795,904 B1  Page 1 of 1
APPLICATION NO. : 10/109499
DATED : September 21, 2004
INVENTOR(S) : Kamvysselis It is certified that error appears in the above-identified patent and that said Letters Patent is hereby corrected as shown below:

ON THE TITLE PAGE ITEM (73) PLEASE DELETE AND INSERT (73) EMC CORPORATION, HOPKINTON, MA (US)

Signed and Sealed this

Twenty-first Day of November, 2006

JON W. DUDAS
*Director of the United States Patent and Trademark Office*